United States Patent [19]
Harrer

[11] Patent Number: 5,690,219
[45] Date of Patent: Nov. 25, 1997

[54] SEAMLESS DISC JACKET

[75] Inventor: Jill L. Harrer, Oakdale, Minn.

[73] Assignee: Imation Corp., Oakdale, Minn.

[21] Appl. No.: 681,883

[22] Filed: Jul. 29, 1996

Related U.S. Application Data

[63] Continuation of Ser. No. 261,720, Jun. 17, 1994, abandoned.

[51] Int. Cl.$^6$ ................................................. B65D 85/57
[52] U.S. Cl. ...................... 206/308.1; 206/312; 229/72
[58] Field of Search ...................... 206/307, 308.1, 206/308.3, 309, 311, 312, 313, 387.13, 784; 229/87.01, 72

[56] References Cited

U.S. PATENT DOCUMENTS

| | | |
|---|---|---|
| 911,794 | 2/1909 | Williams . |
| 1,135,429 | 4/1915 | Bergstrom ................. 229/72 X |
| 1,991,605 | 2/1935 | Dygert ........................ 229/72 |
| 2,333,798 | 11/1943 | Kner . |
| 2,512,577 | 6/1950 | Franck . |
| 3,005,544 | 10/1961 | Chaplin . |
| 3,266,712 | 8/1966 | McCleneghan ............. 229/72 |
| 3,426,960 | 2/1969 | Shore . |
| 3,547,342 | 12/1970 | Smith . |
| 3,556,391 | 1/1971 | Kosterka . |
| 4,339,034 | 7/1982 | Panveno . |
| 4,413,298 | 11/1983 | Pecsok et al. . |
| 4,473,153 | 9/1984 | Colangelo . |
| 4,640,413 | 2/1987 | Kaplan et al. . |
| 4,850,731 | 7/1989 | Youngs . |
| 5,085,318 | 2/1992 | Leverick ................. 206/312 |
| 5,219,417 | 6/1993 | O'Brien et al. . |
| 5,248,032 | 9/1993 | Sheu et al. . |
| 5,284,242 | 2/1994 | Roth et al. .............. 206/310 |
| 5,318,222 | 6/1994 | Barlett .................... 229/72 |
| 5,366,074 | 11/1994 | O'Brien et al. ........... 206/312 |

FOREIGN PATENT DOCUMENTS

| | | |
|---|---|---|
| 0614189 | 9/1994 | European Pat. Off. . |
| 2272887 | 6/1994 | United Kingdom . |

*Primary Examiner*—Jacob K. Ackun
*Attorney, Agent, or Firm*—Eric D. Levinson

[57] ABSTRACT

A seamless jacket for a compact disc is formed from a sheet of material divided into panels folded to form a pocket with one open edge. The seamless jacket is formed by three substantially equal size panels and one flap, and is folded so that no edges or seams contact the information carrying surface of a compact disc held in the seamless jacket. The exterior of the seamless jacket has continuous surfaces that can be printed prior to folding.

2 Claims, 5 Drawing Sheets

5,690,219

SEAMLESS DISC JACKET

This is a continuation of application Ser. No. 08/261,720 filed Jun. 17, 1994 and now abandoned.

BACKGROUND OF THE INVENTION

The present invention relates to a jacket for a compact disc (CD) that can be made completely of recyclable paperboard, and which eliminates all seams and edges from the surfaces which are in contact with the information carrying surfaces of the compact disc.

Compact discs recently have been sold in storage jackets or packages made of recyclable paperboard. Many of these jackets have a pocket into which the compact disc is slid edgewise, much as a conventional record is slid into a paperboard sleeve. It has been found that in existing paperboard compact disc jackets the surfaces of the paperboard jackets that contact the compact disc have seams or flap edges that will tend to mark or scratch the disc surface carrying data or information so that the information may be disrupted or the jacket will have exterior seams which make printing information onto the jacket difficult. Typically, the compact disc jackets are made of a paperboard that has an uncoated inner surface facing the compact disc, while the exterior surface is coated for better appearance.

For example, U.S. Pat. No. 5,248,032 illustrates a compact disc jacket that utilizes double walls on both the front and back panels of the jacket, but it has seams formed between folded-in flaps and a liner panel. The surface against which the disc rests in the jacket has a seam where two panel edges abut. The edges at the seam can become irregular and cause damage to information carrying surface of the compact disc. Damage is likely as a compact disc moves inside the pocket formed in the jacket during shipping or handling or as it is slid into and out of the pocket.

The need for protecting a compact disc is discussed in U.S. Pat. No. 4,850,731, and in this patent a separate sheet is provided for graphics, the separate sheet is inserted behind a clear panel so the graphics are visible, but the pocket receiving the compact disc has an edge that is adjacent to and which can come in contact with the information carrying surface of the compact disc. The pocket is made so that both the edge and the center hole of the compact disc can be accessed for removing the disc.

U.S. Pat. No. 3,005,544 discloses a sleeve or envelope for phonograph records, which has two panels that fold over onto themselves, but which utilizes flaps that are on the exterior of the jacket. An outer wrap package is utilized for protecting the inner envelope or sleeve.

A compact disc protector is also shown in U.S. Pat. No. 4,339,034, which is intended to prevent warping. A compact disc is first placed into an inner cover and the compact disc and inner cover are placed into a folded envelope which in turn is slid into an outer paperboard jacket. Three separate envelopes are thus used for the compact disc.

U.S. Pat. No. 2,512,577 illustrates an envelope or jacket for the safe storage of phonograph records, which has a pair of flaps that fold outer edge to outer edge so the two flaps together form an inner panel of a pocket. The adjacent outer edges of the flaps form a seam in the central portions of the interior of the jacket. An outer panel folds over the flaps to retain them in position. This construction is to eliminate multiple paper thicknesses in localized areas. The envelope or jacket formed thus has a single panel on one side of the record, and a double panel on the other side.

A record packet that forms an envelope by folding up a pair of panels along one edge and then folding in a pair end panels from opposite sides on the exterior of one of the first folded panels is shown in U.S. Pat. No. 991,794. A flap is then used to close the envelope opening. The exterior of this record packet has a multiple thickness overlap of the end flaps in the center portion of the side panel, making it almost impossible to print on such a sheet before folding, and also providing a multiple thickness in the center portions that could be damaging to the softer surfaces of a compact disc.

Another disc or record container is shown in U.S. Pat. No. 2,333,798. In this patent, edge flaps are folded upon one another to form a multiple thickness along the edges to provide a spacer between front and rear panels. The front and rear panels have one open end so that a record can be slid into the space between the front and rear panels.

The prior art does not disclose a compact disc jacket which has no seams on the surfaces of jacket panels that are in contact with the compact disc.

SUMMARY OF THE INVENTION

The present invention relates to a seamless compact disc jacket that has no interior seams that can damage the information carrying surfaces of the compact disc when stored in the pocket of the seamless jacket, and which provides smooth outer jacket surfaces that can be printed prior to folding without concern about exterior seams.

The compact disc jacket can be made from recyclable paperboard stock that is coated on one side for better appearance. When the present jacket is formed, uncoated interior paperboard surfaces are adjacent the compact disc is stored in the pocket of the jacket. The seamless jacket has one double panel wall for increased rigidity over single thickness walls, and makes efficient use of the paper stock or paperboard utilized, as well as providing adequate surfaces for gluing the paperboard panels together to form the seamless interior. The seamless jacket is thus light weight, as is desired for cost effective mailing and to reduce material used for environmental purposes.

The folding operation can be automated, and the depositing of the glue for holding the panels in place to form the jacket can be done on surfaces that are readily accessible.

The seamless interior surfaces avoid problems with scratching or the like. The jacket also has outer surfaces which are without seams or panel overlaps for ease of graphic design and print alignment.

DETAILED DESCRIPTION OF THE PREFERRED EMBODIMENTS

Figure 1:
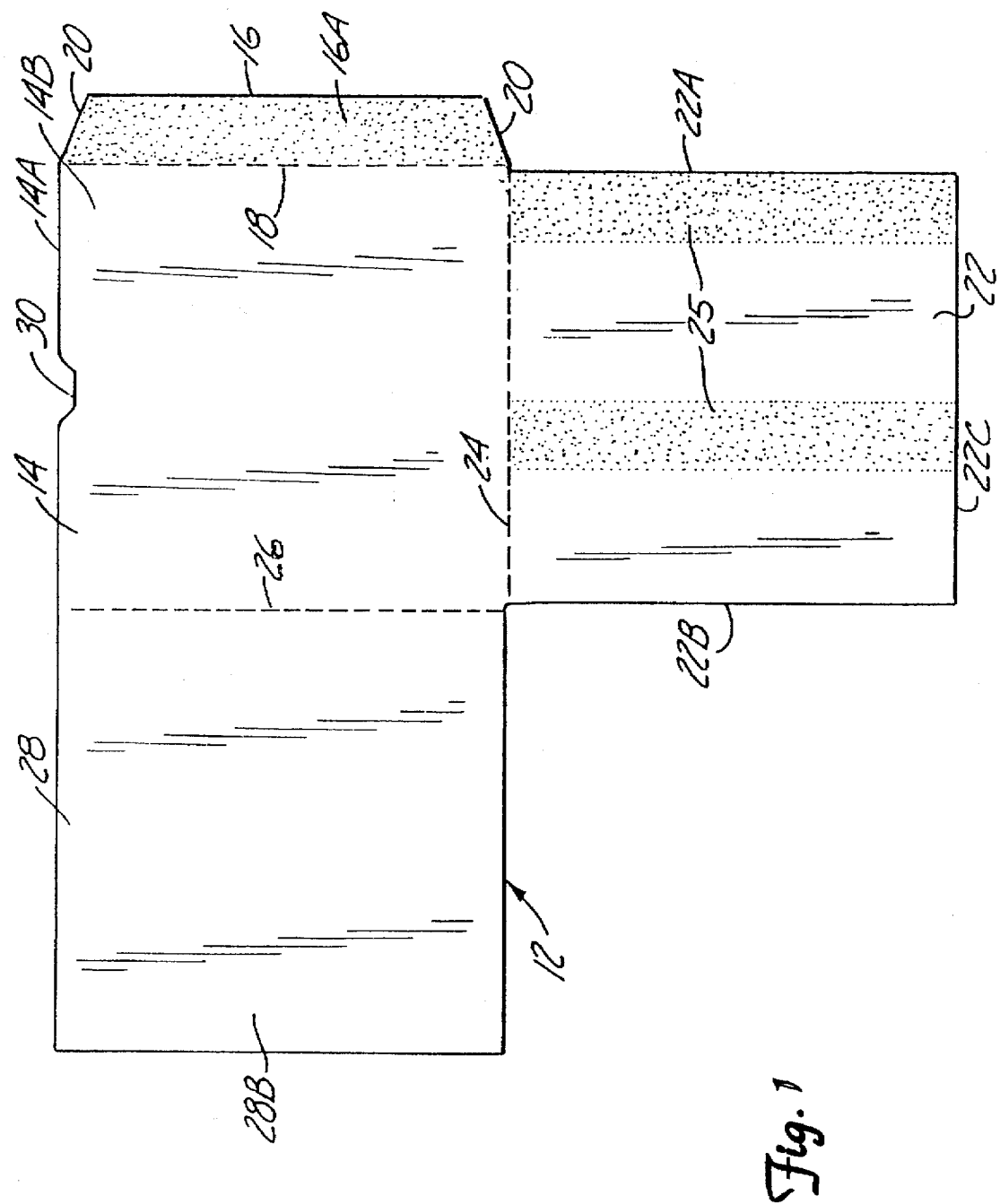
FIG. 1 is a flat layout of a paperboard blank utilized for constructing a seamless jacket made according to the present invention showing an exterior, coated surface.
Figure 2:
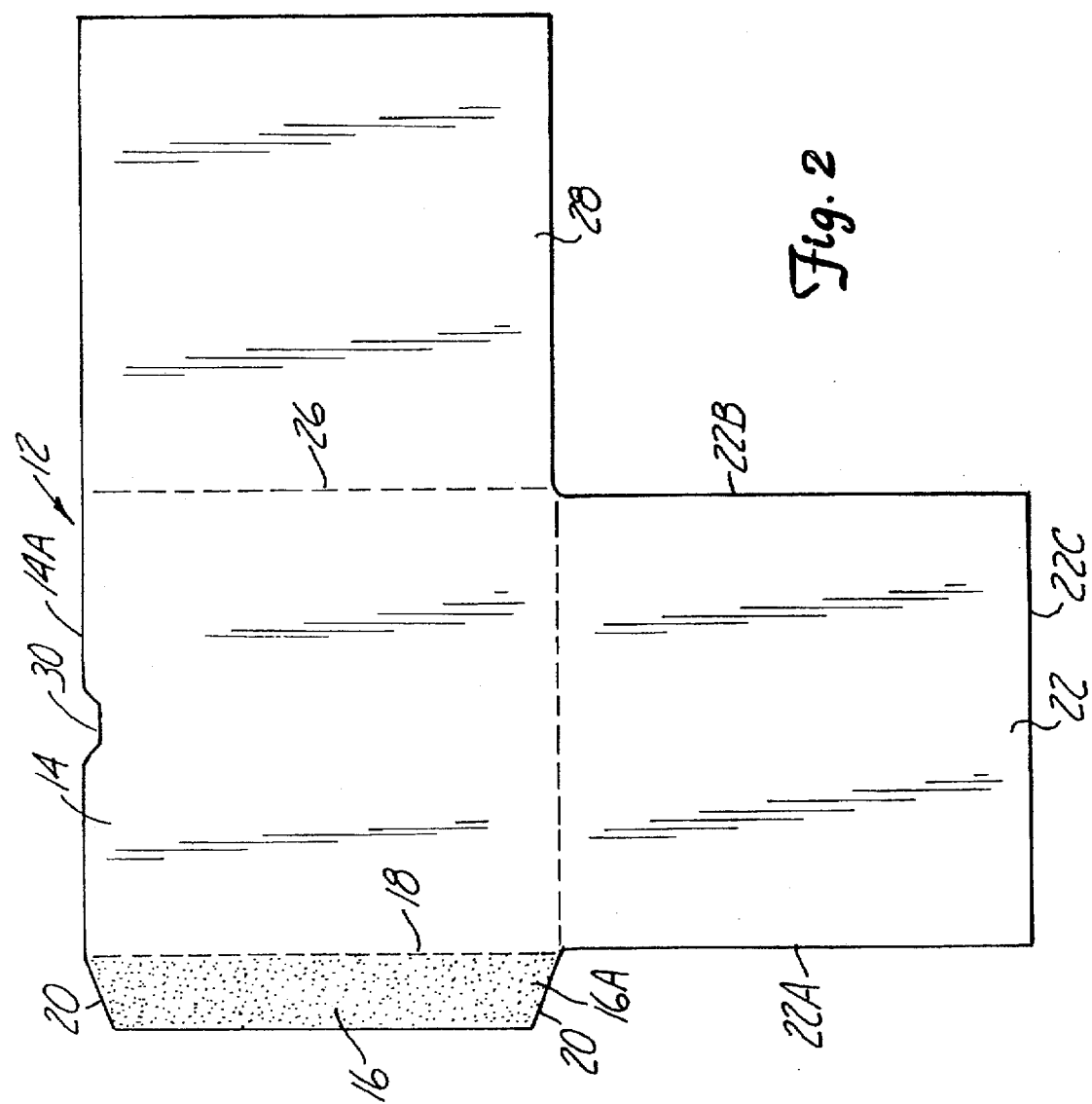
FIG. 2 is a flat layout as in FIG. 1 showing an opposite, uncoated side of the paperboard blank.
Figure 3:
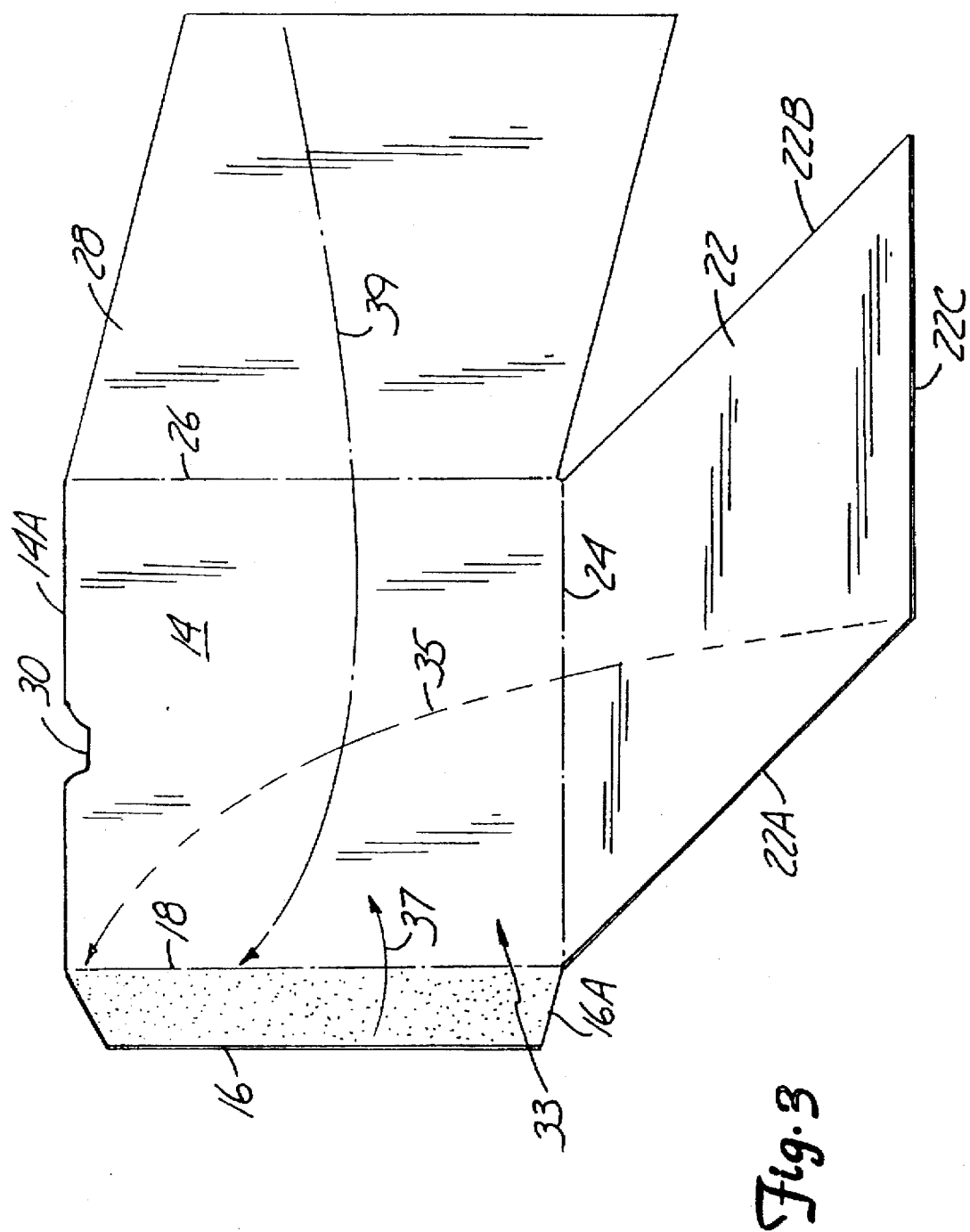
FIG. 3 is a partially folded perspective view of the panels being formed into the seamless jacket of the present invention.
Figure 5:
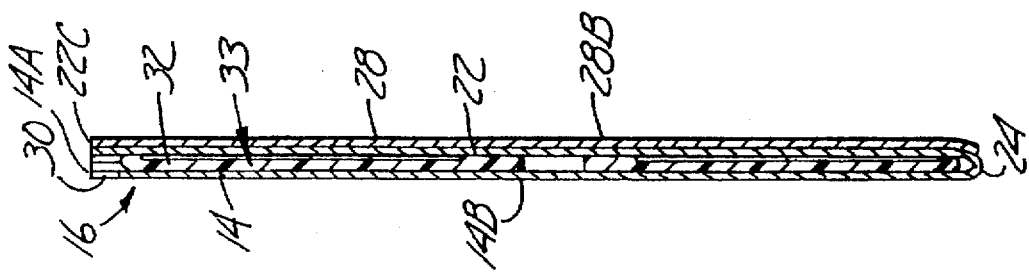
FIG. 5 is a sectional view as on line 5—5 in FIG. 4.
Figure 6:
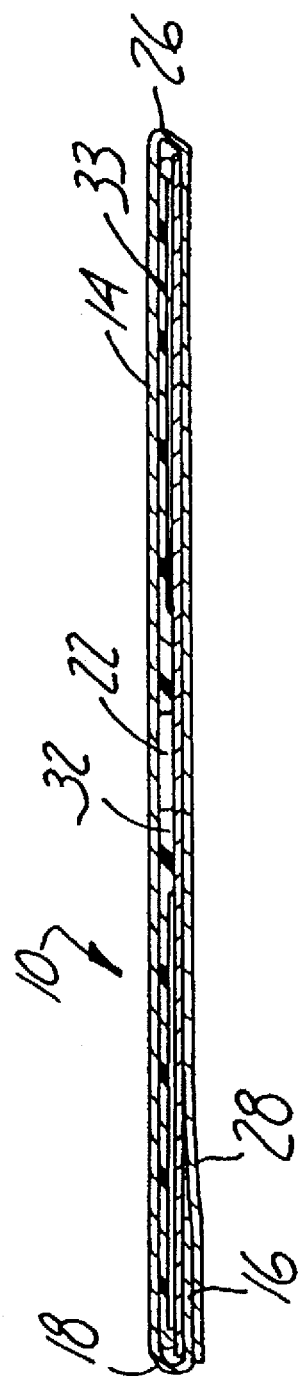
FIG. 6 is a sectional view as on line 6—6 in FIG. 4.

A paperboard blank 12 shown in FIGS. 1 and 2 is formable into a seamless compact disc jacket 10 shown partially formed in FIG. 3 and in sections in FIGS. 5 and 6.

The paperboard blank 12 is made of paper stock that is coated on one side for appearance of exterior surfaces. The coated side is shown in FIG. 1. Printing or graphics are applied on the coated side of the paperboard blank 12 shown in FIG. 1 at an appropriate time prior to folding the various panels to form the seamless jacket 10.

A first panel 14 as shown is of size slightly larger than a compact disc, and can be used as a front panel of the seamless jacket 10. The panel 14 has four edges and a flap 16 is joined thereto at one edge along a fold line 18. The flap has tapered ends shown at 20, and is a fairly narrow flap. That is, if the flap 16 were to be folded over the first panel 14, the flap 16 would not extend all the way across first panel 14.

At a base end of the panel 14, which would be opposite from the opening of the formed seamless jacket, as will be seen, a second inner panel 22 is joined to the first panel 14 along a fold line 24. The inner panel 22 is trimmed in width so that it is slightly less in width than the first panel 14. One edge 22A of the inner panel 22 is trimmed to be inside the fold line 18. A second edge 22B of panel 22 is trimmed to be inside a second fold line 26 between first panel 14 and a third outer panel 28. Outer panel 28 is joined to the first panel 14 along fold line 26 and is substantially the same size as the first or base panel 14. The first panel 14 preferably has a finger or thumb notch 30 along one edge thereof corresponding to the opening of the formed jacket, opposite the fold line 24, as shown.

When the seamless jacket 10 is to be formed, as shown in FIG. 3, the inner panel 22 is folded along line 24 as shown by the dashed line 35 to overlie the first panel 14 so the uncoated surfaces of panels 14 and 22 are facing and the panels form a pocket 33, as can be seen in FIGS. 3 and 5. Panel 22 is not directly adhered to the panel 14, but one edge of the pocket 33 is closed at fold line 24. When the two panels 22 and 14 are folded over each other, the unattached edges 14A and 22C of the panels 14 and 22 are aligned. Then the flap 16 is folded along the fold line 18 over the edge portion 22A of inner panel 22 as indicated by solid arrow 37 in FIG. 3 to engage the coated surface of inner panel 22 that would be exposed after folding inner panel 22. Preferably a suitable adhesive indicated in dots at 16A under the flap 16, or an adhesive strip can be placed on the exposed surface of the folded inner panel 22 in alignment with the flap 16 to hold the flap 16 in position on inner panel 22, serving to close the edge of the pocket 33 at fold line 18. The first panel 14 and the inner panel 22 thereby form the pocket 33 having an opening defined by the unattached edges 14A and 22C, adjacent the notch 30.

A suitable adhesive, preferably a water based adhesive, can be placed onto the exposed surface of inner panel 22 after folding, by way of illustration as shown at 25 in dotted lines in FIG. 1, and adhesive also is placed onto the exposed surface of the folded flap 16 as shown by dots at 26 in FIG. 1. The outer panel 28 which forms an exterior panel for the seamless jacket 10 is folded over inner panel 22 as indicated by arrow 39 and is held in place by such adhesive to overlie the inner panel 22 and the flap 16 and close the edge of the pocket 33 formed at fold line 26. The outer panel 28 extends all the way across the panel 22 to the edge at fold line 18. When panel 28 is secured in place with the provided adhesive over inner panel 22, the seamless jacket 10 is formed, which has no interior or exterior seams on the main side surfaces. A compact disc shown at 32 can be slipped into the pocket 33 of the seamless jacket 10 between unattached edges 14A and 22C.

Figure 4:
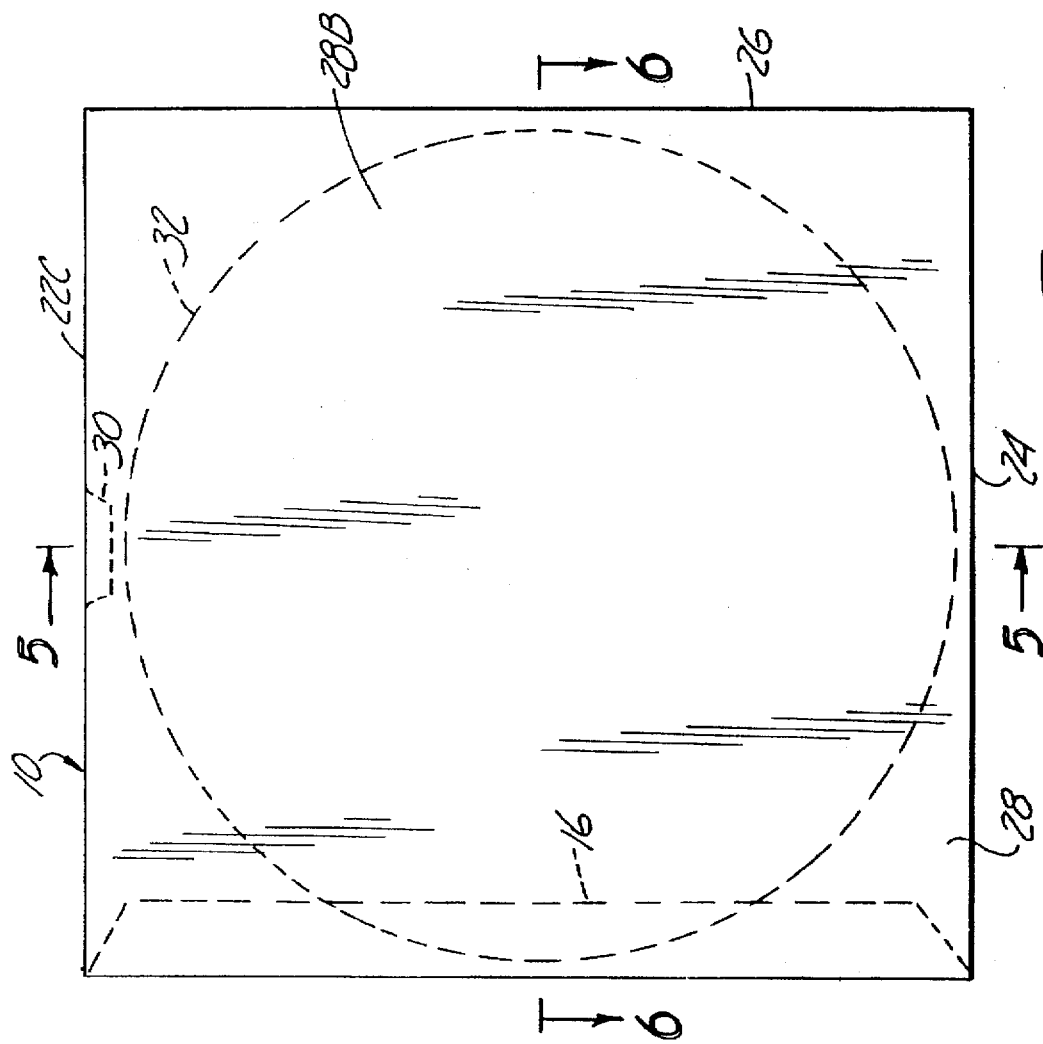
FIG. 4 is a plan view of a seamless jacket formed according to the present invention.

As best seen in FIG. 4, the information carrying surface of the compact disc is engaged only by a smooth, seamless surface of the seamless jacket 10. The facing surfaces of the first panel 14 and the inner panel 22 are continuous protective surfaces. The bottom fold line 24 forms an inner end of the pocket 33 of the seamless jacket 10, and the folded material at fold line 24 engages only the edge of the compact disc inserted in the seamless jacket 10. The edges 22A and 22B of panel 22 are positioned such that the information carrying surface of the compact disc does not come in contact with these edges before the outer edge of compact disc 32 contacts the folds at fold lines 18 or 26, respectively.

The outer surfaces of the first panel 14 and the outer panel 28, which are the exterior surfaces of the seamless jacket 10 and are shown at 14B and 28B respectively, are preferably coated stock that can be printed. The exterior surfaces 14B and 28B are usable for printing graphics, instructions, or any other printed material. There are no seams on the exterior surfaces for ease of graphic design and print alignment.

The fold lines 18, 24 and 26 are at three of the edges of panel 14 and are preferably scored so the folds have some width to accommodate the thickness of a compact disc 32, as can be seen in FIGS. 5 and 6. The arrangement of the panels and flap can be varied from that shown so long as the smooth seamless interior and exterior surfaces result.

The seamless jacket 10 thus can be made of completely recyclable paperboard or any suitable foldable sheet material, and will protect the inserted compact disc with seamless surfaces that face the information carrying surface of the compact disc regardless of the orientation of the disc when it is put into the seamless jacket 10.

The seamless jacket 10 can be die cut quickly and scored along the fold lines. The folding requires few steps to form the seamless jacket 10, and the amount of adhesive used to hold the seamless jacket 10 closed is minimal.

The seamless jacket 10, can also be made of recyclable plastic materials, if desired. The type of material from which the blank is formed is left to selection of the persons working in the field, and as new materials are available, the benefits of a light weight jacket that has smooth seamless surfaces facing the information carrying surfaces of the compact disc will be available with such materials.

Although the present invention has been described with reference to preferred embodiments, workers skilled in the art will recognize that changes may be made in form and detail without departing from the spirit and scope of the invention.

What is claimed is:

1. A three-panel, seamless jacket for a compact disc, consisting of three panels and one flap as follows:
   a first square-shaped panel having a peripheral size to encompass a compact disc;
   a second square-shaped panel joined to said first panel along a first edge to overlay the first panel to form a compact disc receiving packet, wherein the second panel is the same size as the first panel;
   a single flap attached to said first panel along a second edge of the first panel other than the first edge of the first panel which is joined to the second panel, the flap being folded to overlay an outer surface of the second panel;
   a third square-shaped panel attached to the first panel along a third edge of the first panel, the third panel being foldable over the outer surface of the second panel and the flap, wherein the third panel is the same size as the first panel; and
   means to retain the third panel in position overlaying the second panel and flap with the pocket formed between the first and second panels accessible from an open end opposite from one of the first, second and third edges, thereby forming a jacket having an interior for receiving a compact disc and an exterior for receiving printing thereon, wherein the single flap is positioned between the second and third panels so that the jacket has: (a) a flapless exterior, thereby minimizing difficulty of printing thereon, and (b) a flapless interior, thereby minimizing scratching of the disc.

2. A paper board blank for a jacket for an optical storage disc; consisting of three panels and one flap; as follows:

- a first square-shaped panel having a peripheral size to encompass an optical storage disc;
- a second square-shaped panel joined to a first edge of the first panel along a first fold line, the second panel being foldable along the first fold line to overlay the first panel, wherein the second panel is the same size as the first panel;
- a single flap joined to a second edge of the first panel along a second fold line; and
- a third square-shaped panel joined to a third edge of the first panel along a third fold line, the third panel being foldable over the second panel and extending the entire distance between the third fold line and an opposite edge of the first panel when folded, and wherein the third panel is the same size as the first panel, thereby forming a jacket having an interior for receiving an optical storage disc and an exterior for receiving printing thereon, wherein the single flap is positioned between the second and third panels so that the jacket has: (a) a flapless exterior, thereby minimizing difficulty of printing thereon, and (b) a flapless interior, thereby minimizing scratching of the disc.

* * * * *